United States Patent [19]

Böhm et al.

[11] 4,416,796

[45] Nov. 22, 1983

[54] EMULSION-BREAKING COMPOSITION

[75] Inventors: Roland Böhm, Kelkheim; Martin Hille, Liederbach, both of Fed. Rep. of Germany

[73] Assignee: Hoechst Aktiengesellschaft, Frankfurt, Fed. Rep. of Germany

[21] Appl. No.: 101,473

[22] Filed: Dec. 10, 1979

[30] Foreign Application Priority Data

Dec. 20, 1978 [DE] Fed. Rep. of Germany ....... 2854975

[51] Int. Cl.³ .............................................. B01D 17/04
[52] U.S. Cl. .................................... 252/338; 252/358; 252/332
[58] Field of Search .......... 252/338, 358, 332, 8.55 R, 252/8.55 D; 260/456 R, 456 A, 457, 458 R

[56] References Cited

U.S. PATENT DOCUMENTS 2,946,747  7/1960  Kirkpatrick et al. ................ 252/338
3,205,169  9/1965  Kirkpatrick et al. ................ 252/338

*Primary Examiner*—Josephine Barr
*Attorney, Agent, or Firm*—Connolly and Hutz

[57] ABSTRACT

Use of surface-active neutral salts of sulfonic acids of the formula I

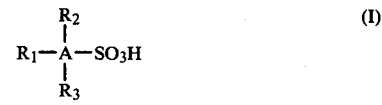

wherein

A stands for a saturated aliphatic hydrocarbon radical or an aliphatic hydrocarbon radical having one olefinic double bond each having 3 carbon atoms, or a mononuclear or binuclear aromatic radical, especially phenyl or naphthyl, $C_6H_2$ or $C_{10}H_4$, $R_1$ stands for alkyl or alkenyl having from 1 to 21 carbon atoms, especially 1 to 18 carbon atoms and $R_2$ and $R_3$ each stand for hydrogen or alkyl having from 1 to 4 carbon atoms, and of oxethylated aliphatic amines of the formula II

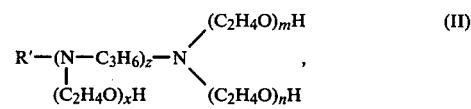

wherein
R' stands for a saturated aliphatic hydrocarbon radical or an aliphatic hydrocarbon radical having one or two olefinic double bonds each radical having from 8 to 25, preferably 10 to 2, carbon atoms, z stands for 0 or 1 and m, n and x each stand for integers of from 0 to 20, the sum of m, n and X amounting to an integer of from 2 to 40, as demulsifiers for the demulsification of water-containing crude oil and oil sludge emulsions.

6 Claims, No Drawings

EMULSION-BREAKING COMPOSITION

Excepting the starting production phase in an oil field, petroleum is produced with the aid of water of varying salinity, this salinity possibly being such that the water is saturated mainly with sodium chloride. This gives emulsions mainly of the water-in-oil type. These emulsions are generally broken by adding small amounts of surfactants, optionally followed by heating, while being brought to the water content necessary for the transport or the further processing. The different compositions of the different types of petroleum and their different production conditions require the use of different surfactants as demulsifying substances, in order to obtain an optimum separation, that is to obtain a complete separation of the phases under the respective conditions given in as short a period as possible, the oil phase having as low a salt and water content as possible and the water phase having as low an oil content as possible.

Suitable substances for the demulsification of crude oils are, by way of example, the reaction products of alkylene oxides with alkyl phenol aldehyde resins. Products of this type which are designated hereinafter as "resin-base demulsifier" and the reaction ratios of alkyl phenols, aldehyde and propylene and ethylene oxide to be maintained during the manufacture of these products are disclosed, for example in U.S. Pat. Nos. 2,499,368; 2,499,370; 2,524,889; 2,560,333 and 2,574,543.

A further class of suitable conventional demulsifiers is that of the block and copolymers of propylene oxide and ethylene oxide. These products are described, for example, in French Pat. No. 1 069 615 and in German Auslegeschrift No. 1 018 179. Suitable likewise efficient demulsifiers may further be obtained on cross-linking of the said block and copolymers with one another or with substances of the resin-base demulsifier type. Suitable cross-linking agents are, for example, dicarboxylic acids, diisocyanates, phosphorus halides and phenol aldehyde resin substances. Demulsifiers of this type are disclosed, for example in German Pat. No. 1 642 825.

However, in some cases, the demulsibility of all of these known products is not sufficient for attaining a satisfactory separation of oil and water phase. Difficulties of this type arise especially with some oil types of defined production areas, for example Nigeria and Brunei, whose emulsions could be broken hitherto only on combined use of demulsifiers and various acids.

Very often difficulties moreover arise owing to the fact that in the treatment plants of oil emulsions there are formed so-called sludges containing metal compounds of the elements iron, zinc, vanadium, chromium and the like, in the interlayer between the oil and the water phase, these sludges being capable of forming emulsion-stabilizing soaps. In these cases an appropriate demulsification so as to comply with the requirements as regards the salt and the water content requires a higher treatment temperature, greater amounts of demulsifiers or even a separate treatment of the oil sludge.

The known demulsifiers further fail in most cases in the separation of water-containing oil sludges as obtained in refining plants, in certain industrial processes and in collecting basins of waste oil to be reprocessed or be disposed of.

It has now been found surprisingly that surface-active neutral salts of oxethylated aliphatic amines and alkyl-, alkenyl- or alkylarylsulfonic acids ensure an appropriate treatment of oil sludges so as to comply with the requirements as regards the salt and the water content in the said cases, wherein the usual demulsifiers fail, or substantially favor this treatment. The surface-active neutral salts used as demulsifiers in accordance with the present invention consequently ensure a demulsification of crude oil emulsions which could be broken hitherto only by additional use of acids, an improvement of the emulsion separation of heavy crude oils having a tendency to form sludges and demulsification of water-containing oil sludges as obtained in refining plants, industrial processes and in the waste oil reprocessing.

The present invention therefore relates to the use of surface-active neutral salts of sulfonic acids of the formula I

wherein

A stands for a saturated aliphatic hydrocarbon radical or an aliphatic hydrocarbon radical having one olefinic double bond each having 3 carbon atoms, or a mononuclear or binuclear aromatic radical, especially phenyl or naphthyl, $C_6H_2$ or $C_{10}H_4$, $R_1$ stands for alkyl or alkenyl having from 1 to 21 carbon atoms, especially 1 to 18 carbon atoms and $R_2$ and $R_3$ each stand for hydrogen or alkyl having from 1 to 4 carbon atoms, and of oxethylated aliphatic amines of the formula II

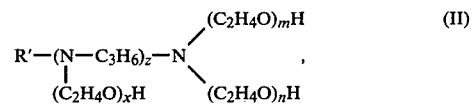

wherein

R' stands for a saturated aliphatic hydrocarbon radical or an aliphatic hydrocarbon radical having one or two olefinic double bonds each radical having from 8 to 25, preferably 10 to 2, carbon atoms, z stands for 0 or 1 and m, n and x each stand for integers of from 0 to 20, the sum of m, n and x amounting to an integer of from 2 to 40, as emulsion-breaking composition of oil emulsions.

The surface-active neutral salts to be used in accordance with the present invention are prepared in known manner suitably by slowly mixing equivalent quantities of both components, that are sulfonic acids and the oxyethylated amines. One component, especially the sulfonic acid, may alternatively be used in a slight excess, whereby the demulsifying properties are generally not substantially influenced, however. The neutralization heat occuring during neutralization is suitably dissipated by appropriate cooling. Suitable sulfonic acids of the formula I adapted for the preparation of the surface-active neutral salts of the process of the invention are especially toluene sulfonic acid or methylnaphthalene sulfonic acid, dodecylbenzene sulfonic acid, dibutylnaphthalene sulfonic acid, paraffin sulfonic acid and olefin sulfonic acids, preferably those having from approximately 6 to 20 carbon atoms. Suitable oxethylated amines of the formula II are in the first place the reaction products of from 2 to approximately 40 mols of ethylene oxide with one mol of a long chain aliphatic monoamine or propylene diamine such as coconut fatty amine, lauryl amine, oleyl amine, stearyl amine, tallow fatty amine, coconut fatty propylene diamine, and tallow fatty propylene diamine. The sulfonic acids and the amines may both be used as such or in admixture with products corresponding to the formulae I and II.

The surface-active neutral salts may be used as such or in combination with other known demulsifiers for breaking oil emulsions or water-containing oil sludges. In many cases, the use of a combination of surface-active neutral salts and known demulsifiers has proved particularly advantageous as very often synergistic demulsifying effects are reached in this manner. The weight ratios at which the surface-active neutral salts have to be used in conjunction with the usual demulsifiers may vary within wide limits, for example of from approximately 1 to 50 to approximately 50 to 1 weight parts, combinations of surface-active neutral salts and known demulsifiers wherein the proportion of the surface-active neutral salts is in the range of approximately 4 to 30 weight percent being used preferably.

Suitable known demulsifiers to be used optionally in conjunction with the surface-active neutral salts in accordance with the present invention include especially the so-called resin-base demulsifiers are disclosed, for example, in U.S. Pat. Nos. 2,499,368, 2,499,370, 2,534,889, 2,560,333 and 2,574,543, and the block and copolymers of propylene and ethylene oxide, as known, for example from French Pat. No. 1 069 650 and from German Auslegeschrift No. 1 018 178 or finally the products obtained on cross linking of these block and copolymers with one another or with the resin-base demulsifiers, for example as described in German patent 1 642 825.

The demulsifiers should be added to the oil emulsions to be resolved in a manner such that as efficient and rapid a mixing as possible be ensured. The demulsifiers can be added as substance or suitably in the form of a solution in water or in an appropriate organic solvent such as a lower alcohol, benzene, toluene, xylene, petrol or mixtures of aromatic compounds, in order to reach a more efficient mixing.

The quantities of demulsifiers to be added to the oil emulsions depend especially on the nature and on the composition of the oil emulsions to resolve and on the physical conditions during demulsification such as temperature and turbulence of the oil emulsions and they have hence to be determined for each case by a test. Generally these quantities amount from approximately 2 to 500 g, especially from 5 to 50 g/t of emulsion to be resolved.

The demulsification tests specified in the following examples were carried out in the following manner: 100 cm$^3$ portions of the oil emulsions to be demulsified were charged into conical calibrated separation glasses and subsequently supplemented with the respective quantities of the demulsifiers to be tested. To reach an efficient dispersion of the demulsifiers throughout the emulsion, the samples were shaken intensively for 5 minutes and immediately thereupon placed in a water bath maintained at constant temperature in order to adjust the demulsification temperature at the required level. Reading of the quantity of water settled from the emulsion took place after the respective indicated periods of time.

The composition of the demulsifiers (designated as A, B, C, and D) used in the demulsification tests and of the surface-active neutral salts in accordance with the instant invention (designated as U, V, W, X, Y and Z) can be seen from the following table:

Demulsifiers
- A block polymer prepared by addition of 27 mols of ethylene oxide to 1 mol of propylene glycol of average molecular weight 1,900,
- B block polymer prepared by addition of 32 mols of ethylene oxide to 1 mol of polypropylene glycol of average molecular weight 1,900,
- C cross-linked product obtained on cross-linking of 235 weight parts of an oxyethylated nonylphenol formaldehyde resin which latter is obtainable by reacting p-nonylphenol with a little more than the equimolar quantity of formaldehyde and by addition of 5 mols of ethylene oxide to 1 mol of the resin, which corresponds to a molar weight of approximately 5 times that of the unity nonylphenol-formaldehyde, with 300 weight parts of a block polymer A and 125 weight parts of a commercial toluylene diisocyanate, at 140° to 170° C., within one hour.
- D resin base demulsifier prepared by reacting p-nonylphenol with a little more than the equimolar quantity of formaldehyde in the presence of sodium hydroxide and subsequent addition of 10 mols of propylene oxide and 2 mols of ethylene oxide to 1 mol of nonylphenol formaldehyde resin, whose molar weight corresponds approximately five times to that of the entity nonylphenol-formaldehyde.
- U surface-active neutral salt prepared from approximately equivalent quantities of dodecylbenzene sulfonic acid and an addition compound of 8 mols of ethylene oxide to 1 mol of oleylamine.
- $V_1$ surface-active neutral salt prepared from p-toluene sulfonic acid and an addition product of 5 mols of ethylene oxide to 1 mol of coconut fatty amine,
- $V_2$ surface-active neutral salt prepared from p-toluene sulfonic acid and an addition product of 8 mols of ethylene oxide to 1 mol of coconut fatty amine,
- $V_3$ surface-active neutral salt prepared from p-toluene sulfonic acid and an addition product of 10 mols of ethylene oxide to 1 mol of coconut fatty amine,
- $W_1$ surface-active neutral salt prepared from dodecylbenzene sulfonic acid and an addition product of 15 mols of ethylene oxide to 1 mol of stearylamine,
- $W_2$ surface-active neutral salt prepared from dodecylbenzene sulfonic acid and an addition product of 20 mols of ethylene oxide to 1 mol of stearylamine,
- $W_3$ surface-active neutral salt prepared from dodecylbenzene sulfonic acid and an addition product of 25 mols of ethylene oxide to 1 mol of stearylamine,
- $X_1$ surface-active neutral salt prepared from a secondary alkane sulfonic acid having from 13 to 18 carbon atoms and an addition product of 5 mols of ethylene oxide and 1 mol of tallow fatty amine,
- $X_2$ surface-active neutral salt prepared from $C_{13-18}$ alkane sulfonic acid and an addition product of 10 mols of ethylene oxide to 1 mol of tallow fatty amine,
- $X_3$ surface-active neutral salt prepared from a $C_{13-18}$ alkane sulfonic acid and an addition product of 15 mols of ethylene oxide to 1 mol of tallow fatty amine, $X_4$ surface-active neutral salt prepared from $C_{13-18}$alkane sulfonic acid and an addition product of 20 mols of ethylene oxide to 1 mol of tallow fatty amine, $Y_1$ surface-active neutral salt prepared from an olefin sulfonic acid having from 15 to 18 carbon atoms and an addition product of 5 mols of ethylene oxide to 1 mol of tallow fatty propylene diamine, $Y_2$ surface-active neutral salt prepared from $C_{15-18}$ olefin sulfonic acid and an addition product of 10 mols of ethylene oxide to 1 mol of tallow fatty propylene diamine, $Y_3$ surface-active neutral salt prepared from $C_{15-18}$ olefin sulfonic acid and an addition product of 15 mols of ethylene oxide to 1 mol of tallow fatty propylene diamine, Z surface-actie neutral salt prepared from dodecylbenzene sulfonic acid and an addition product of 15 mols of ethylene oxide to 1 mol of coconut fatty amine.

The following examples illustrate the invention in greater detail:

EXAMPLE 1

The crude oil used in this example for demulsification tests contained approximately 40 volume % of water and had been produced in Brunei.

The following demulsifiers were tested for their demulsifying effect in comparative manner, at 45° C.:

I. Demulsifier A (block polymer),

II. Mixture of 30 weight % of demulsifier A, 25 weight % of dodecylbenzene sulfonic acid and 45 weight % of acetic acid, III. Demulsifier U (surface-active neutral salt).

The demulsifiers were used in 350 ppm portions as 65% solutions in methanol. The demulsifying effect was examined after a separation time of 10, 30, 60 and 120 minutes, respectively, by measuring the precipitated portion of water, sludge interlayer and clear oil. A blank test without the addition of demulsifier was carried out as well. The results of the comparative tests are summarized in Table 1.

(The data shown in the Table represent the respective portions, expressed in volume %, referred to the total volume of the crude oil sample).

TABLE 1

| Demulsifier | Separation time | Clear crude oil (vol. %) | Sludge interlayer (vol. %) | Water (vol. %) |
|---|---|---|---|---|
| without (blank test) | 10 min. | 1 | 99 | 0 |
|  | 30 min. | 2 | 98 | 0 |
|  | 60 min. | 3.5 | 96.5 | 0 |
|  | 120 min. | 5.0 | 95.0 | 0 |
| I Demulsi- | 10 min. | 2 | 98 | 0 |

TABLE 1-continued

| Demulsifier | Separation time | Clear crude oil (vol. %) | Sludge interlayer (vol. %) | Water (vol. %) |
|---|---|---|---|---|
| fier A | 30 min. | 5 | 95 | 0 |
|  | 60 min. | 12 | 88 | 0 |
|  | 120 min. | 14 | 86 | 0 |
| II Demulsifier B + acid | 10 min. | 36.0 | 42.1 | 21.9 |
|  | 30 min. | 42.3 | 29.0 | 28.7 |
|  | 60 min. | 48.0 | 15.8 | 36.2 |
|  | 120 min. | 54.8 | 7.6 | 37.6 |
| III Demulsifier U | 10 min. | 44 | 37 | 23 |
|  | 30 min. | 51 | 16 | 33 |
|  | 60 min. | 53 | 8.5 | 38.5 |
|  | 120 min. | 56.5 | 4.5 | 39.0 |

EXAMPLE 2

In demulsification tests there were added to a crude oil containing approximately 20 volume % of water of Kuwait origin the demulsifiers A, B and mixtures of these demulsifiers and the surface-active neutral salts $V_1$, $V_2$ and $V_3$, respectively. In each of the mixed demulsifiers the weight ratio of block polymer to surface-active neutral salt was 4:1. In each of the demulsification tests the demulsifiers or demulsifier mixtures were used in an mount of 500 ppm as 50% solutions in butanol. The demulsification temperature was 60° C. The quantity of water settled down after 3 hours was taken as a measure for the demulsifying effect. The results are summarized in the following Table 2.

TABLE 2

| Demulsifier | A | B | A + $V_1$ | A + $V_2$ | A + $V_3$ | B + $V_1$ | B + $V_2$ | B + $V_3$ |
|---|---|---|---|---|---|---|---|---|
| precipitated quantity of water in cm$^3$ | 4.1 | 5.8 | 11.2 | 13.1 | 13.0 | 13.8 | 13.4 | 10.5 |

EXAMPLE 3

Demulsification tests were carried out in the manner described in Example 2, except that the demulsifiiers A, B, C and mixtures of these demulsifiers were used in a weight ratio of 4:1 in conjunction with the surface-active neutral salts $W_1$, $W_2$ and $W_3$, respectively.

The results are summarized in Table 3.

TABLE 3

| Demulsifier | A | B | C | A + $W_1$ | A + $W_2$ | A + $W_3$ | B + $W_1$ | B + $W_2$ | B + $W_3$ | C + $W_1$ | C + $W_2$ | C + $W_3$ |
|---|---|---|---|---|---|---|---|---|---|---|---|---|
| precipitated quantity of water in cm$^3$ | 0 | 3.5 | 0 | 4.6 | 8.3 | 9.8 | 12.2 | 18.4 | 18.0 | 4.6 | 11.6 | 12.8 |

EXAMPLE 4

Demulsification tests were carried out in accordance with the test arrangement of Example 2 using a crude oil containing approximately 15 volume % of water, of Egyt origin. The resolving effect of the known demulsifiers A and B and of mixtures of these known demulsifiers with surface-active neutral salts from p-toluene sulfonic acid and coconut fatty aminoxyethylate of varying ethylene oxide content (demulsifiers $X_1$, $X_2$, $X_3$, $X_4$) was tested in comparative manner. The weight ratio of the block polymers A and B to the surface-active neutral salts in these mixtures was again 4:1. The demulsifiers were used in 50 ppm portions as 50% solutions in isobutanol. The quantity of water precipitated after 3 hours, at a demulsification temperature of 65° C. was again taken as a measure for the demulsifying effect.

TABLE 4

| Demulsifier | A | B | A + X₁ | A + X₂ | A + X₃ | A + X₄ | B + X₁ | B + X₂ | B + X₃ | B + X₄ |
|---|---|---|---|---|---|---|---|---|---|---|
| precipitated quantity of water in cm³ | 2.5 | 3.8 | 6.7 | 9.5 | 13.8 | 14.0 | 7.3 | 10.6 | 13.5 | 13.8 |

EXAMPLE 5

Demulsification tests were carried out in analogous manner as in Example 4 with the use of the same crude oil as in Example 4, except that there were used as mixing components for the known demulsifiers A and B surface-active neutral salts of olefin sulfonic acid and oxethylated tallow fatty propylene diamine of varying ethylene oxide content (demulsifiers $Y_1$, $Y_2$ and $Y_3$). The results are summarized in Table 5.

TABLE 5

| Demulsifier | A | B | A + Y₁ | A + Y₂ | A + Y₃ | B + Y₁ | B + Y₂ | B + Y₃ |
|---|---|---|---|---|---|---|---|---|
| precipitated quantity of water in cm³ | 2.5 | 3.8 | 5.5 | 9.2 | 13.0 | 6.0 | 11.8 | 13.2 |

EXAMPLE 6

The crude oil used in this example had a water content of approximately 24 volume % and had been produced in the field Hohne in the Federal Republic of Germany. A resin-base demulsifier (demulsifier D) and mixtures of this demulsifier with varying quantities of a surface-active neutral salt of dodecylbenzene sulfonic acid and coconut fatty aminoxyethylate (demulsifier Z) ere tested in comparative manner for their demulsifying effect. For the tests there were used mixtures containing 10 weight %, 20 weight %, 30 weight %, 40 weight % and 50 weight %, respectively, of the surface-active neutral salt. The demulsifiers were used in 50 ppm portions, as 50% solutions in isobutanol. The quantity of water precipitated after 3 hours at a demulsification temperature of 30° C. was taken as a measure for determining the demulsifying effect.

The results are summarized in Table 6.

TABLE 6

| Weight % of demulsifier D | 100 | 90 | 80 | 70 | 60 | 50 |
|---|---|---|---|---|---|---|
| weight % of demulsifier Z | — | 10 | 20 | 30 | 40 | 50 |
| precipitated quantity of water in cm³ | 5.3 | 10.2 | 15.8 | 18.5 | 20.8 | 21.6 |

EXAMPLE 7

A block polymer (demulsifier A) and mixtures of this known demulsifier containing varying quantities of a surface-active neutral salt of dodecylbenzene sulfonic acid and oxethylated oleylamine (demulsifier U) were tested in comparative manner for their demulsifying effect on a crude oil containing approximately 20 volume % of water of Kuwait origin, the testing being done in the manner described in Example 6.

The results are summarized in Table 7.

TABLE 7

| Weight % of demulsifier A | 100 | 90 | 80 | 70 | 60 | 50 |
|---|---|---|---|---|---|---|
| weight % of demulsi- | — | 10 | 20 | 30 | 40 | 50 |

TABLE 7-continued

| fier U | | | | | | |
|---|---|---|---|---|---|---|
| precipitated quantity of water in cm³ | 8.0 | 14.1 | 16.2 | 17.8 | 18.2 | 17.4 |

EXAMPLE 8

A waste oil having a water content of approximately 12 volume % and a residue on ignition of 0.76 weight % could be demulsified only in unsatisfactory manner hitherto with the aid of the known demulsifiers. This waste oil was used to test a known demulsifier (block polymer demulsifier B) and a mixture of this block polymer in a weight ratio of 1:1 with a surface-active neutral salt of dodecylbenzene sulfonic acid and oxethylated oleylamine (demulsifier U), for their demulsifying effect at a demulsification temperature of 60° C. The demulsifiers were used in an amount of 100 ppm, 500 ppm and 1000 ppm, respectively, as 50% solutions in isobutanol. The precipitated quantities of water were determined after 10, 30 and 60 minutes, respectively.

The results of these tests are summarized in Table 8, the precipitated quantities of water being indicated in %, referred to the total water content of the waste oil of 12%.

TABLE 8

| | Settling time (min.) | Concentration | | |
|---|---|---|---|---|
| | | 100 ppm | 500 ppm | 1000 ppm |
| | | % of water precipitation | | |
| Demulsifier B | 10 | 11.5 | 18.3 | 24.6 |
| | 30 | 28.3 | 41.2 | 56.3 |
| | 60 | 33.0 | 48.5 | 62.3 |
| Demulsifiers B + U | 10 | 45.0 | 58.0 | 67.3 |
| | 30 | 63.0 | 72.0 | 84.5 |
| | 60 | 74.0 | 86.3 | 93.2 |

The advantageous resolving properties of the surface-active neutral salts to be used in accordance with the present invention can be clearly seen from the results of the demulsification tests. These advantages can be seen particularly distinctly with waste oils, whose demulsification with the aim of satisfying the demands as regards the water content and the salt content, could be carried out hitherto only with difficulty or only with additional use of acid demulsifier formulations. Surface-active neutral salts and especially mixtures of these surface-active neutral salts with appropriate known demulsifiers make it possible to resolve waste oils of the above type in more efficient manner. The surface-active neutral salts in accordance with the instant invention moreover have clear advantages as regards the transport and handling of the oil emulsions in the oil field, as compared to the hitherto used acidcontaining demulsifier compositions, which involved the danger of corrosion on proportioning devices, pipe lines and treatment plants in the oil field.

The demulsification of waste oils and oil sludge emulsions has been a problem ever since, as they very often contain, in addition to water and solids, surfactants of varying nature, which render a satisfactory demulsification difficult. The waste oils and oil sludge emulsions must either be practically completely dehydrated prior to being reused or their water content has to be lowered beyond a critical limit in order to enable a combustion to be carried out. As it can be seen from Example 8, the surface-active neutral salts in according with the present invention make it possible to resolve this problem and to reach a distinctly better separation of the water than when using conventional demulsifiers alone.

What is claimed is:

1. Surface active neutral salts of sulfonic acids of the formula I

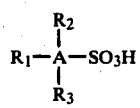

wherein

A stands for a saturated aliphatic hydrocarbon radical or an aliphatic hydrocarbon radical having one olefinic double bond each having 3 carbon atoms, or a mononuclear or binuclear aromatic radical, especially phenyl or naphthyl, $C_6H_2$ or $C_{10}H_4$, $R_1$ stands for alkyl or alkenyl having from 1 to 21 carbon atoms, especially 1 to 18 carbon atoms and $R_2$ and $R_3$ each stand for hydrogen or alkyl having from 1 to 4 carbon atoms, and of oxethylated aliphatic amines of the formula II

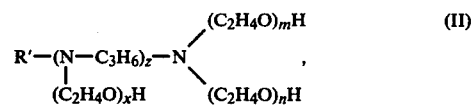

wherein $R'$ stands for a saturated aliphatic hydrocarbon radical or an aliphatic hydrocarbon radical having one or two olefinic double bonds each radical having from 8 to 25, preferably 10 to 2, carbon atoms, z stands for 0 or 1 and m, n and x each stand for integers of from 0 to 20, the sum of m, n and x amounting to an integer of from 5 to 40, as demulsifiers for the demulsification of water-containing crude oil and oil sludge emulsions.

2. Process for demulsification of water-containing crude oil and oil sludge emulsions which consists in treating the crude oil and oil sludge emulsions with a surface-active neutral salt of sulfonic acid as claimed in claim 1.

3. Process as claimed in claim 2, which comprises employing the surface-active neutral salts in conjunction with known emulsion-resolving agents in a weight ratio of from 1:50 to 50:1.

4. Process as claimed in claim 2, which comprises employing mixtures of surface-active neutral salts and known emulsion-resolving agents, wherein the proportion of the surface-active neutral salt is in the range of approximately 4 to 30 weight %.

5. Process as claimed in claim 2, which comprises adding the demulsifiers to the emulsion to be resolved as solutions in water or in an organic solvent.

6. Process as claimed in claim 2, which comprises employing per ton of emulsion to be resolved approximately from 2 to 500 g of demulsifier.

* * * * *